March 16, 1926.

C. W. JACK

DISPLAY CARTON

Filed July 20, 1922      5 Sheets-Sheet 1

1,576,731

Inventor:
Charles W. Jack,
by Wallace R. Lane
Atty.

March 16, 1926.

C. W. JACK

DISPLAY CARTON

Filed July 20, 1922   5 Sheets-Sheet 2

Inventor:
Charles W. Jack,
by Wallace R. Lane.
Atty.

March 16, 1926.

C. W. JACK

DISPLAY CARTON

Filed July 20, 1922       5 Sheets-Sheet 3

1,576,731

Inventor:
Charles W. Jack,
by Wallace R. Lane
Atty.

March 16, 1926.

C. W. JACK

DISPLAY CARTON

Filed July 20, 1922 5 Sheets-Sheet 4

1,576,731

Inventor:
Charles W. Jack,
by Wallace R. Lane
Atty.

March 16, 1926.

C. W. JACK

DISPLAY CARTON

Filed July 20, 1922    5 Sheets-Sheet 5

Inventor:
Charles W. Jack,
by Wallace R. Lane.
Atty.

Patented Mar. 16, 1926.

1,576,731

UNITED STATES PATENT OFFICE.

CHARLES W. JACK, OF CHICAGO, ILLINOIS.

DISPLAY CARTON.

Application filed July 20, 1922. Serial No. 576,179.

*To all whom it may concern:*

Be it known that I, CHARLES W. JACK, a citizen of the United States, residing at Chicago, Illinois, have invented certain new and useful Improvements in Display Cartons, of which the following is a specification.

The present invention relates to boxes, cartons, or containers of the type having means for displaying the merchandise, goods, wares, articles, and the like contained therein when placed on sale, advertised or similarly shown or exhibited.

Among the objects of the invention are to provide an improved device of the character described, made or produced from a single blank or sheet of material, such as card board or the like, cut, scored and slitted so that it may be folded in the form of a box, carton or container for holding the merchandise, goods, wares, and various other similar articles of sale to be transported or shipped, as from a wholesaler to a retailer; to provide an improved lid or cover which when opened can be folded to form a display panel or showcard upon which may appear advertising, descriptive, or other similar matter preferably pertaining to the goods on display in the carton, such as the title, quality, trade-mark, prices and the like; to provide the improved carton with portions that are extensible or distensible to form a support for holding the carton in its advertising or displaying position, preferably in an inclined or sloping position whereby the contents of the box or carton may be the most advantageously exposed to view, and are collapsible to reduce the bulk of the carton when not used for displaying purposes; to provide the extensible support with means preventing the support from extending too far and rendering the collapsible operation impossible or difficult; to provide the carton with portions between which the supporting means may slide and be hidden from view when in collapsed condition; to provide the cover portion with improved means cooperable with a part of the box body for holding or supporting the folded cover portion in its advertising or announcing position; and to provide other objects, advantages and capabilities, as will later more fully appear and that are inherently possessed by the invention.

In the drawings showing a few embodiments of the invention by way of illustration.

Figure 1:
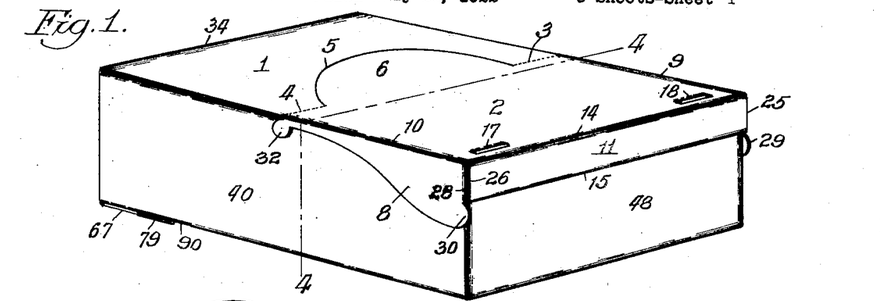
Fig. 1 is a perspective view of a carton constructed in accordance with the invention, the carton being shown in closed condition.
Figures 2, 3:
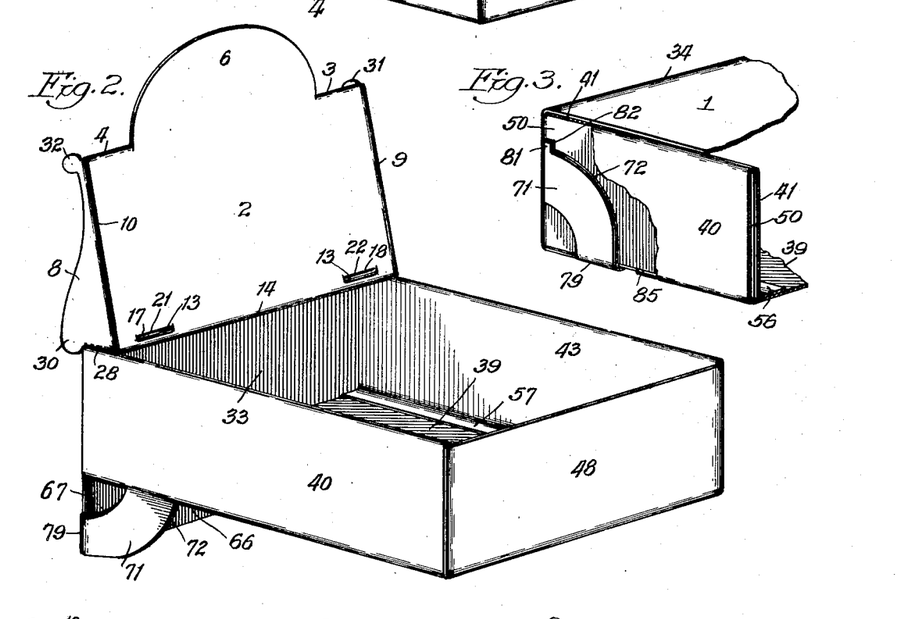
Fig. 2 is a similar view with the carton in displaying position.
Fig. 3 is a detail view of a part of the extensible and collapsible support with parts shown in broken view.
Figure 4:
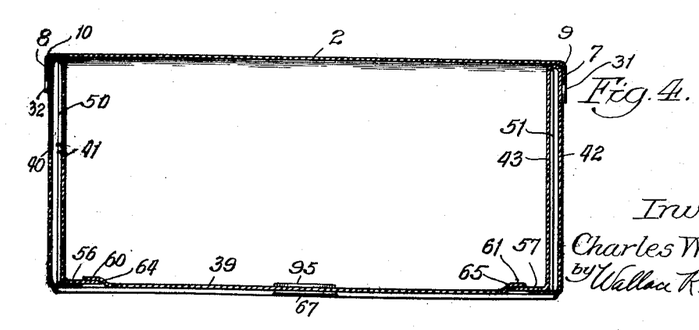
Fig. 4 is a transverse sectional view taken on line 4—4 of Fig. 1 of the drawing.
Figure 5:
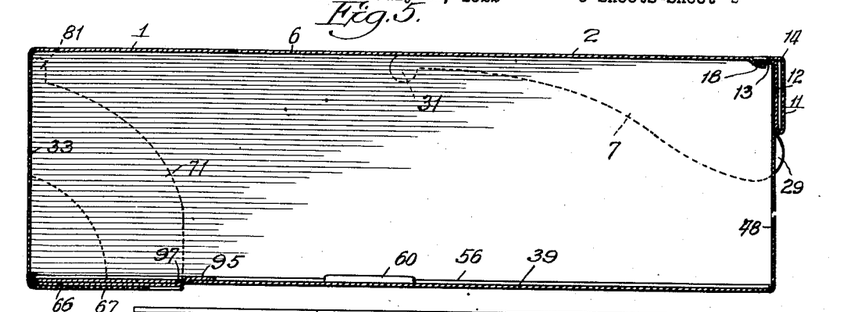
Fig. 5 is a longitudinal sectional view of the carton shown in Fig. 1.
Figures 6, 7, 8:
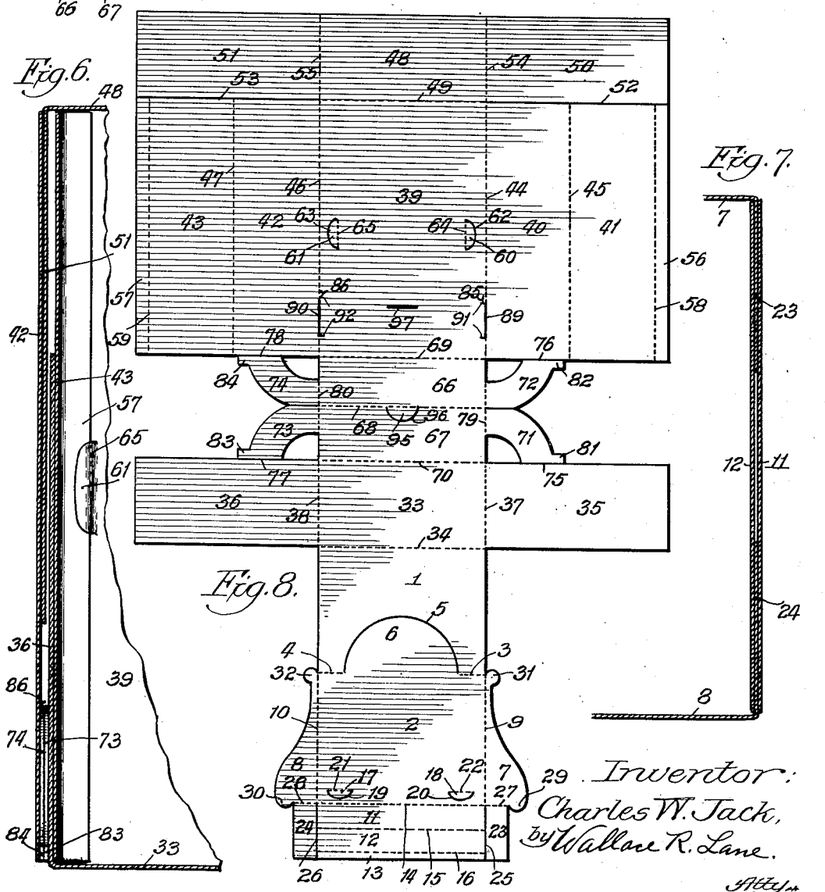
Fig. 6 is a fragmentary horizontal sectional view of a side wall of the carton.
Fig. 7 is a similar view of the front end wall of the carton.
Fig. 8 is a developed plan view of the unitary blank from which the complete carton is produced.

Referring now more particularly to the drawings and, first, to Figs. 1 to 8 thereof, the invention is shown as formed from a single sheet or die-cut blank, such as card board, shown in a developed form in Fig. 8 of the drawing, and as comprising top, bottom, side and end wall portions. The cover or top portion comprises two main sections or portions 1 and 2 hinged together at the scorings 3 and 4 so that the sections 1 and 2 may be adjacently located in an upstanding position, as shown in Fig. 2 of the drawing, for displaying to view the matter, such as printed or written advertisements, prices, trade-marks and other similar matters, upon the section 2. Between the sections 1 and 2 may be made a substantially semi-circular die-cut 5 for the purpose of forming a tongue 6 which will extend upwardly, as shown in Fig. 2, and give added area to the section 2 in such position, as well as giving the section 2 a more ornamental shape than a plain rectangular form would give it. At the sides of the top section or portion 2 are formed lateral extensions or flange portions 7 and 8 hinged to the portion 2 at the scorings 9 and 10. These flange portions lie adjacent to the sides of the box, when the cover is closed as shown in Fig. 1 of the drawing, and act as supports or props for the cover when it is upstanding and tilted back in displaying position, as shown in Fig. 2 of the drawing. At the forward end of the portion 2 are formed flange portions 11 and 12 and a lock strip or tab portion 13 for forming the end flange of the cover section 2, this end flange lying adjacent the forward end of wall of the box when the cover is closed, as shown in Fig. 1 of the drawing, or resting upon the rear end of the side walls of the box, when the cover is raised to form a display panel, as shown in Fig. 2 of the drawing. The portions 11, 12 and 13 are foldable on the scorings 14, 15 and 16 so that the section 12 may be brought against the portion 11 to form a double wall, and the flange unit then bent about line 14 until the unit is substantially at right angles to the plane of the portion 2. The strip 13 is folded about the line 16 so that it will lie against the inner face of the section 2 and lock with tongues 17 and 18 by being inserted beneath these tongues. The tongues 17 and 18 are formed by arc-shaped die-cuts 19 and 20, the tongues being bendable about scorings 21 and 22 conveniently made for that purpose, as shown in Fig. 8 of the drawings. The forward ends of the flange portions 7 and 8 have tongue portions 23 and 24 cut free from the end-flange units on lines 25 and 26 and bendable on scorings 27 and 28. The tongues are inserted between the portions 11 and 12 when they are folded against each other, thus conveniently providing a connection between flanges 7 and 8 and the front end flange unit composed of the portions 11, 12 and 13. The flanges 7 and 8 also have rounded end portions 29 and 30 which, when the cover is opened for display purposes, act as anchors over the rear end of the box for stably holding the cover in upright position, as shown in Fig. 2 of the drawing or for bearing laterally or pinching against the side walls 40 and 42 of the body so that the panel 2 may be held at any desired position upon the top edges of the side walls. At the other end of the flanges 7 and 8 are formed tabs 31 and 32 which form parts of the flanges 7 and 8 and, together with the parts 29 and 30 and the curved outline of the portions 7 and 8, also give an ornamental appearance to the cover when in opened position. It will be noted that section 2 of the cover, with the adjunctive portions connected to it, acts as a brace for the cover when in opened and displaying position. The cover may be located, by means of the corner portions formed by the connection of the flanges 7 and 8 to the front end flanges 11—12, at different positions along the rear end edge portions of the side walls of the box for giving the section 2 any desired inclination, within limits, that will be most suitable for exposing the matter on section 2 to view.

To the rear end of section 1 of the cover is connected a rear section 33 bendable on the scoring 34. At the ends of the rear wall portion 33 are connected side wall tongues 35 and 36 also bendable on the scorings 37 and 38. These tongues, when folded, extend into the side walls of the box as will later more fully appear.

The body of the box comprises a bottom section or portion 39 having side and end extensions which go to make up the side and end walls of the box. The side wall portions comprise sections 40, 41, 42 and 43 foldable on lines or scorings 44, 45, 46 and 47 and the front end wall comprises a section or portion 48 foldable at scoring 49. The portion 48 has end extensions or tongues 50 and 51 cut free from the side wall portions 40—41 and 42—43 at lines 52 and 53, and are foldable on the scorings 54 and 55. The tongues 50 and 51 are designed to extend into the side walls of the box and form part of them, the same as in the case of tongues 35 and 36, all of these tongues serving to connect the end walls to side walls. The portions 41 and 43 have locking strips 56 and 57 foldable on lines 58 and 59. These strips overlie the bottom 39, when the box is folded, (see Fig. 4), and extend under tongues 60 and 61 struck up from the bottom 39 by cuts 62 and 63, the tongues being bendable on scorings 64 and 65 as clearly shown in Figs. 4, 6 and 8, of the drawing.

At the rear end of the bottom 39 are connected sections or portions 66 and 67 foldable on a scoring 68 so that the sections may be folded against each other to form a support or leg for the box. These sections also are foldable on scorings 69 and 70 so that the portions 66 and 67 may be bent or folded with respect to the bottom 39, as will later more fully appear. At the ends of the portions 66 and 67 are arc shaped stays or leg portions 71, 72, 73 and 74 cut free from the portions 35 and 36, 40 and 42 at lines 75, 76, 77 and 78. The stays of each pair 71—72 and 73—74 are foldable against each other so that each pair acts as a single unit, when slid into and out of the side walls of the box, as will later more fully appear. The stays are also foldable on scorings 79 and 80 for their lying substantially at right angles to the sections 66—67 and for readily sliding into the side walls of the box. At the free ends of the stays are formed integral stop lugs 81, 82, 83 and 84 which operate to hit or rest against the end portions 85 and 86 of the bend made between the side wall portions 40 and 42 and the bottom portion 39. These bends are suitably formed with slits or cuts 89 and 90 and the bottom 39 has side cuts 91 and 92 running into these slits for facilitating the entry of the ends of the legs. The stop lugs operate in pairs 81—82 and 83—84, and when the support is extended as shown in Fig. 2 of the drawing, the lugs rest upon the end portions 85 and 86 of the bends. See Fig. 3 of the drawing. In this way the stays cannot be withdrawn too far. For the purpose of holding the supporting members 66—67 in closed or collapsed position, a tongue 95 is struck up from the sections 67 by a die cut 96 and this tongue is insertable in a slot 97 formed in the bottom 39 of carton. See Figs. 4, 5 and 8 of the drawing. When the support is collapsed with the stays slid into the side walls of the box, the ends of the stays come to rest against the bends 37 and 38 between the portion 33 and tongues 35 and 36. When assembling, the blank shown in Fig. 8, may be folded by first folding the blank on lines 68 and 69. This will bring the stays 71, 72, 73 and 74 together in pairs. Each pair of stays may then be folded back on lines 79 and 80 so that their ends are brought opposite the slits 89 and 90. The end of the stays may then be introduced through the slits and the lugs 81—82 and 83—84 located to rest upon the portions 85 and 86. The end portion 88 may then be bent up on line 49 and the tongues 35, 36, 50 and 51 folded on lines 37, 38, 54 and 55 respectively. This will bring the tongues over the lines 44 and 46 in overlapped relation with each other and also against the stays 71—72 and 73—74. At this stage of folding the walls 66 and 67 are together. The side portions including the sections 40 and 42 are now folded up on lines 44 and 46 to lie adjacent the overlapping pair of tongues 35—50 and 36—51. The sections 41 and 43 are next bent down about the lines 45 and 47 adjacent the inside of the tongue pairs 35—50 and 36—51. In this way the sections are folded to form double side walls having the tongues nested therein, as clearly shown in Figs. 4 and 6 of the drawing. The strips 56 and 57 are then bent about the lines 58 and 59 and inserted under the tongues 60 and 61, the latter being forced upwardly from the bottom 39 for this purpose. The box is now complete except for the cover. The latter may be folded and formed before the body of the box is folded and formed, if desired.

To form the cover, the side wings or flanges 7 and 8 may be first folded on lines 9 and 10 and then the tongues 23 and 24 folded laterally thereof about lines 27 and 28 so as to lie under the line 14. The portion 11 is then folded about line 14 and the portion 12 folded up about line 15 so that the portion 12 will lie adjacent the inner face of the portion 11. This forms the double wall of the front end flange of the section 2. The strip 13 is bent on line 16 and inserted under the tongues 17 and 18, the latter being pushed in to assist this result. As the portion 12 is folded over it will lie over the laterally bent tongues 23 and 24 so that the latter will be nested between the walls 12 and 11 of the front flange, as shown in Figs. 5 and 7 of the drawing. The cover may be closed by bending it, as a whole, about the line 34 and bringing the flanges 7, 8 and 11—12 in overlapping relation with the front end portion of the box, as shown in Fig. 1 of the drawing. When it is desired to display the contents of the box, the cover is raised and the sections 1 and 2 caused to bend on the lines 3 and 4 and the corners 27 and 28 made to repose or rest upon the rear end portions of the upper edges of the side walls of the box, as shown in Fig. 2 of the drawing. In this position the section 2 forms the front wall and the section 1 forms the rear wall, of the display panel, the portion 6 extending upwardly as an extension of the section 2. The tabs or anchor portions 29 and 30 are hooked or anchored over the rear upper corners of the box for anchoring the section 2. If desired, the panel, as a whole may be inclined more or less about the line 24 as an axis and the corners 27 and 28 made to move along the top edges of the side walls, within limits, in accommodation thereof, the anchors 29 and 30 still continuing to hold the panel in place but rocking in accommodation of the change in inclination of the panel. The box may be supported in an inclined position by having its rear end raised on the support 66—67, as shown in Fig. 2 of the drawing. When the support 66—67 is not to be used or when the box is closed, the support 66—67 is bent about the lines 69 and 70, to bring the support 66—67 against the lower face of the bottom 39, the stays 71—72 and 73—74 sliding upwardly in between the double walls of the side walls of the box, as clearly shown in Figs. 3 and 5 of the drawing.

To close the cover the anchor members 29 and 30 are disengaged from the rear corners of the box and the cover is straightened out to bring the section 2 in closed position with the flanges 7, 8 and 11—12 overlapping the forward end portion of the box, as shown in Figs. 9, 10, 11 and 12 of the drawing. The box body is of the same construction as shown in Figs. 1 to 8 inclusive but the forward end portion of the cover section 2 and the sliding stay portions of the support are modified. In these constructions the stay portions 100 are in the shape of a complete sector instead of having cut-out segmental portions between the stays and the lower rear corners of the box. Compare Figs. 2 and 9 of the drawing. In other respects the support and its stays are identical with that shown in Figs. 1 to 8 inclusive of the drawing and are operable in the same manner. It is to be understood that the form of support shown in Fig. 9 may be used in lieu of that shown in Fig. 2 irrespective of whether or not the cover structure shown in Fig. 1 be used, or any other form of cover structure, such as that shown in Figs. 10, 11, 14 and 15.

Figure 9:
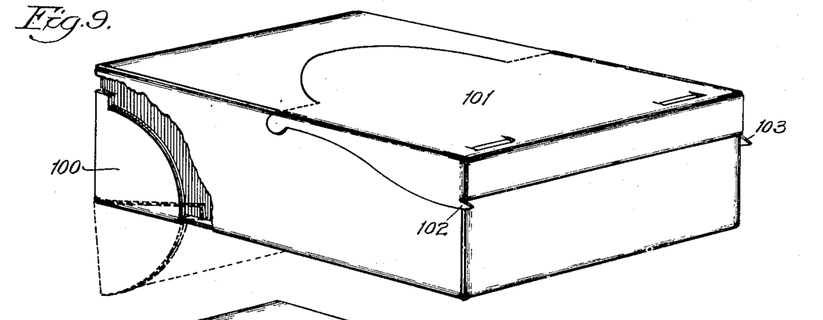
Fig. 9 is a perspective view of a modified form of the invention.

The cover section 101 in the form of device shown in Fig. 9 has sharp anchor portions 102 and 103 in lieu of the rounded anchor members shown in Figs. 1 to 8 inclusive of the drawing. By so making these anchors they may be more readily and quickly hooked over the rear upper corners of the box and hold the cover in displaying position with greater stability than if the portion 102 were rounded, in which case the rounded portion would allow greater rocking of the display cover.

Figures 10, 11, 12, 13:
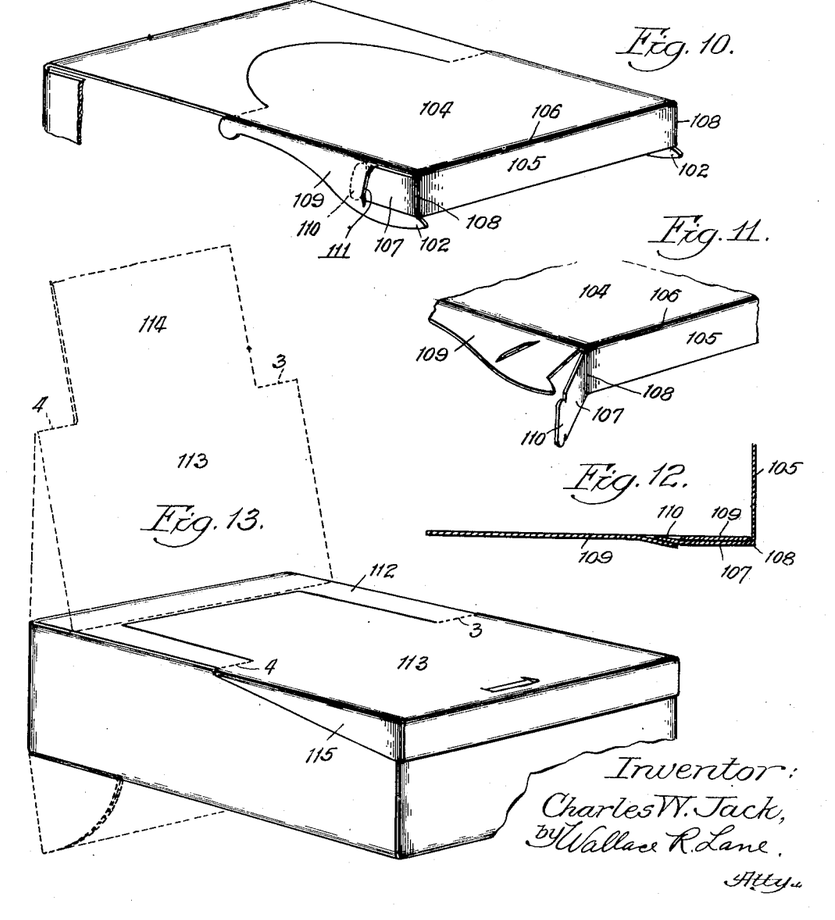
Fig. 10 is a fragmentary perspective view of a modified form of the invention.
Fig. 11 is a fragmentary view of the form shown in Fig. 10, showing the mode of forming the corner of the cover portion of the carton.
Fig. 12 is a fragmentary horizontal section of the part shown in Fig. 11.
Fig. 13 is a perspective view of another embodiment of the invention.

In the form shown in Figs. 11, and 12 the cover section 104 has an end portion 105 bent about the line 106 to form a single wall flange at the forward end of the cover. At the ends of the portion 105 are extensions or tongues 107 which are bent about the lines 108 so that the tongues 107 may lie adjacent the outer face of the side flanges 109 to form a part of the cover. The extreme or free ends of the tongues 107 are provided with head portions 110 adapted to be slid through slits 111 formed in the flange 109, as clearly shown in Figs. 10 and 11 of the drawing. The flanges 109 may have pointed anchor members 102 or, if desired, the anchor members may be of the form shown in Figs. 1 to 8 inclusive of the drawing.

In Fig. 13 is shown a box constructed similar to that shown in Figs. 1 to 10 inclusive. The body is identical to that shown in Figs. 1 to 8 inclusive, and the supporting means may be, if desired, of the form shown in Figs. 2 and 3 or that shown in Fig. 9. The cover is formed similarly to that shown in Figs. 1 to 8 inclusive, but is simpler. In this form the cover sections 112, 113 have a substantially rectangular tongue 114 instead of a substantially semicircular tongue 6 shown in Figs. 1, 2 and 8 of the drawing, the sections being hinged about the lines 3 and 4 as in the other form described. The side flanges 115 have straight edges in lieu of the curved edges of the flanges 7 and 8 shown in Figs. 1, 2, 5 and 8, and also omit the anchor members 29 and 30 or 102 and 103, as well as the ornamental tabs or scrolls 31 and 32 of the structure shown in Figs. 1 to 10 inclusive.

Figures 14, 15, 19:
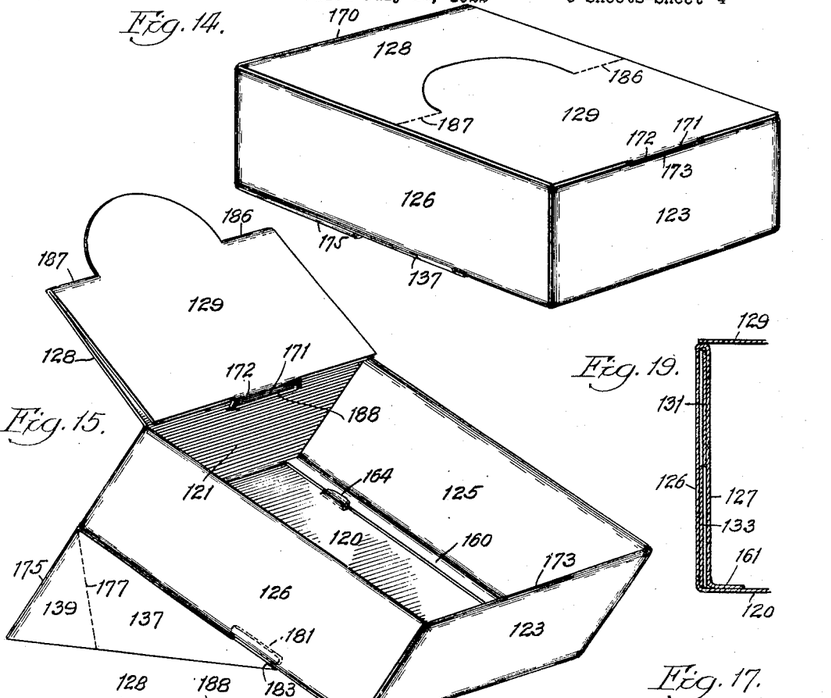
Fig. 14 is a perspective view of another embodiment of the invention.
Fig. 15 is a similar view of the same showing the carton in displaying position.
Fig. 19 is a vertical sectional view taken through a side wall of the box.
Figures 16, 17, 18:
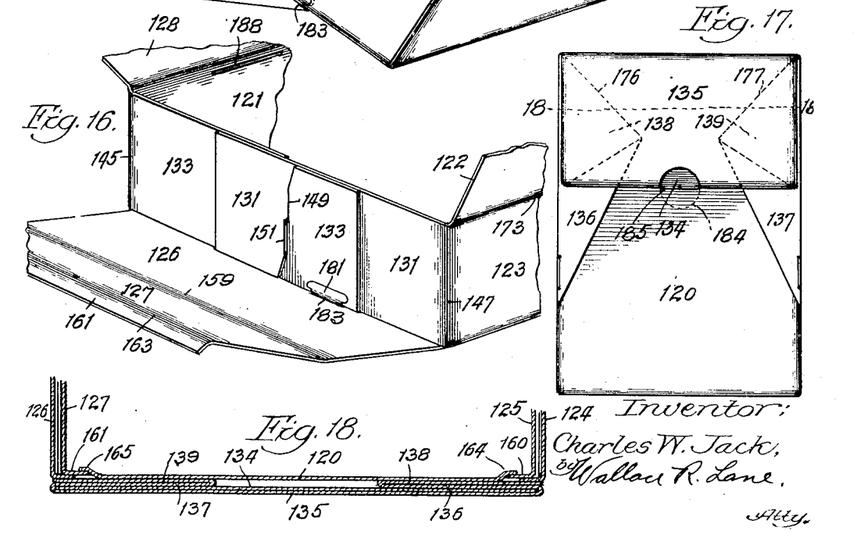
Fig. 16 is a fragmentary perspective view of the joints in the side walls of the carton.
Fig. 17 is a bottom plan view of the carton shown in Fig. 14.
Fig. 18 is a fragmentary sectional view taken transversely through the bottom of the carton substantially on the line 18—18 of Fig. 17.

In Figs. 14 to 21 inclusive is shown another embodiment of the invention with simpler and less costly forms of cover and supporting means. As in the other form, the box or carton is also produced from a single blank or sheet material shown in Fig. 21 of the drawing. The body of the box, in this construction, comprises a bottom portion 120, a rear end portion 121 of single thickness, a double wall forward end portion comprising sections 122 and 123, double side walls having sections 124, 125, 126 and 127, a top having sections 128, 129, side wall tongues 130, 131, 132 and 133, which nest in pairs in the side wall, and a support comprising sections 134, 135, 136, 137, 138 and 139. To fold the blank to produce the box, the blank may be first folded on the lines or scorings 140 and 141. This brings the sections 134 and 135 together to form the double walls of the support, and the lines 141 and 142 together to form the rear lower edge of the box. The section 123 can then be bent up about line or scoring 143. The tongues 130, 131, 132 and 133 are then bent inwardly on scoring 144, 145, 146 and 147 and connected together in pairs 130—132 and 131—133. These tongues have side-cuts or slits 148, 149, 150 and 151 with tapered entries 152, 153, 154 and 155, these cuts interengaging with each other for positively interlocking the ends of the tongues, as clearly shown in Fig. 16 of the drawing. The tapered entries 152, 153, 154 and 155 facilitate the connecting of these tongues together, but they may be omitted or made non-tapered, if desired. With the tongues so connected, the side walls may next be folded over by folding the sections 124 and 126 about lines 156 and 157, and further folding sections 125 and 127 about lines 158 and 159 as shown in Fig. 19 of the drawing, the tongues being nested between these folded sections. Strips or tabs 160 and 161, formed on sections 125 and 127, are then bent on lines 162 and 163 and inserted beneath the tongues 164 and 165 struck-up, by die cutting, from the bottom 120. The section 122 may next be folded over on line 166 and the tab or strip 167 bent on line 168 to be inserted under the struck-up tongue 169, thus forming the double front end wall. The top may then be folded over by bending section 128 about line 170 and the end tab or tongue 171 bent on line 172 and inserted in a slit 173 cut into the edge form by bending on line 166.

Figure 20:
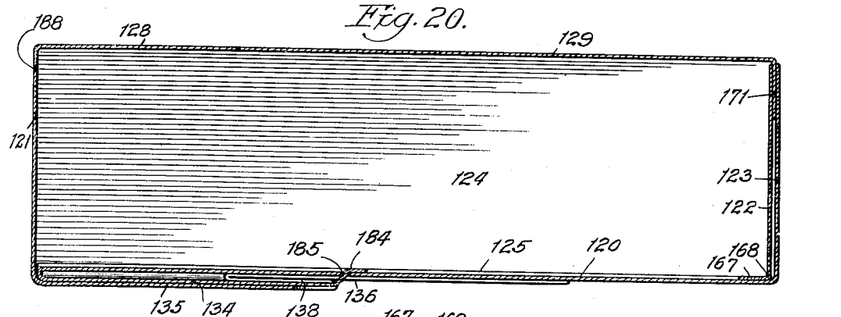
Fig. 20 is a longitudinal sectional view of the carton shown in Fig. 14.
Figure 21:
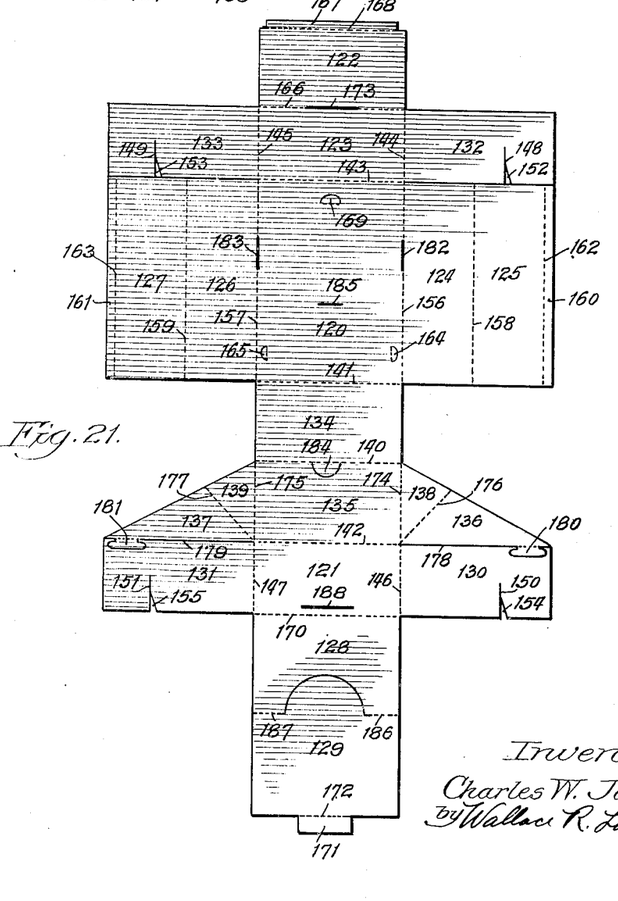
Fig. 21 is a developed plan view of the unitary blank form from which the carton is produced.

The winged portions 136—138 and 137—139 may be folded on lines 174 and 175 to bring them under the bottom 120 and then the sections 136 and 137 further folded back on lines 176 and 177 to bring the edges 178 and 179 beneath the lower side edges of the box. The ends of the portions 136 and 137 are provided with elongated tongues 180 and 181 which are inserted in between the sections 124 and 125, and 126 and 127 through slits 182 and 183 cut into the lower side edges of the box on the lines 156 and 157 as shown in Figs. 15, 16, 17 and 21 of the drawing. The support or leg 134—135 may then be folded back about the edges or lines 141—142 toward the bottom 120, the bends about lines 176 and 177 in sections 136—138 and 137—139 being, at the same time, folded in between the support 134—135 and the bottom 120, as clearly shown in Figs. 17, 18 and 20 of the drawing. For the purpose of holding these parts in folded position the support 134—135 may have a tongue 184, bendable on line 140, capable of being inserted into the slit 185 cut into the bottom 120 as shown in Fig. 20 of the drawing. To support the box in inclined position this tongue is withdrawn and the support 134—135 drawn back, thus opening the side wings 136—138 and 137—139, as shown in Fig. 15 of the drawing. To set the cover into displaying position, the tongue 171 is withdrawn from the slit 173 and the cover section bent on lines 186 and 187 until the sections 128 and 129 attain a position such as is shown in Fig. 15 of the drawing. The tongue 171 may then be inserted into a slot 188 cut into the end wall section 121. The panel 128—129 may thus be held in vertical upright position or at any inclination, within limits, as desired, the friction of the tongue 171 in the slot 188 being sufficient to hold the panel in any of its adjusted positions.

While I have herein described and shown upon the drawings, a few embodiments of the invention, it is to be understood that the invention is not limited to the particular construction, details and arrangements of parts shown and described but that it comprehends other constructions, details and arrangements of parts without departing from the spirit of the invention.

Having thus described my invention, I claim:

1. A container composed of sheet material bent to form a body and a cover hinged to one end of said body, said cover being bent to form a display panel above said body and having anchor members bearing laterally against an end portion of said body for holding said panel in a given inclined upright position.

2. A container fashioned from sheet material bent to form a body and a cover hinged to one end of said body, said cover comprising a pair of sections foldable on a transverse line to bring the section at the free end of said cover adjacent and in front of the other of said sections to form a display panel, said forward section having projections pressing laterally against the sides of the body for holding said folded sections in upright position.

3. A container fashioned from sheet material bent to form a body and a cover hinged to one end of said body, said cover comprising a pair of sections foldable on a transverse line to bring the section at the free end of said cover adjacent and in front of the other of said sections to form a display panel, said forward section being provided with side flanges having projecting portions adjacent the sides and the end of the body to which the cover is hinged for holding said folded sections in upright position.

4. A container composed of sheet material bent to form a body and a cover hinged to one end of said body, said cover being bent in open position to form a display panel above said body and comprising flange portions resting on the side walls of said body near the end thereof for holding said panel in upright position, said flanges having projections engaging an end wall of said body for maintaining said panel in upright position, said flanges engaging the sides of said body when said cover is in closed position.

5. A container composed of a one-piece sheet bent to form a body, a cover therefor and a support, said support being hinged to an end and to the bottom of said body.

6. A container composed of sheet material bent to form a body, a cover therefor and a support, said support being hinged to an end of said body, and having stay members extending into said body.

7. A container composed of sheet material bent to form a body, a cover therefor and a support, said body having double side walls and said support having stay members slidable in said side walls when said support is being extended from or folded against the bottom of the body.

8. A container composed of sheet material bent to form a body, a cover therefor and support, said support being hinged to said body and having curved stays slidably extending into said body, means on said stays to limit the outward movement of said support and stays.

9. A container composed of sheet material bent to form a body, a cover therefor and a support, said support being hinged to said body and having curved stays slidably extending into said body, said stays having stops engaging with said body when said support and stays are in extended position and disposed at an end of said body when said support and stays are in collapsed position.

10. A container composed of sheet material bent to form a body, a cover therefor and a support, said body having double side walls, said support being hinged to said body and having laterally bent stays slidable in said double walls, and means for limiting the outward movement of said stays and supports.

11. A container composed of sheet material bent to form a body, a cover therefor and a support, said body having double side walls, said support being hinged to said body and having laterally bent stays slidable in said double walls, said stays having projections limiting the outward movement of said stays and support.

12. A container composed of sheet material bent to form a body, a cover therefor and a support, said body having double side walls, said support being hinged to said body and having laterally bent stays slidable in said double walls, said stays being arc-shaped and slidable in said side walls through slits provided in the lower edges of said side walls.

13. A container composed of sheet material bent to form a body, a cover therefor and a support, said body having double side walls, said support being hinged to said body and having laterally bent stays slidable in said double walls, said stays being arc-shaped and slidable in said side walls through slits provided in the lower edges of said side walls, and having projections cooperating with the lower edges of said side walls to limit the outward movement of said stays and bent support.

14. A container composed of sheet material bent to form a body, a cover therefor and a support, said body having double side walls, said support being hinged to said body and having laterally bent stays slidable in said double walls, said stays being arc-shaped and slidable in said side walls through slits provided in the lower edges of said side walls, and having projections cooperating with the lower edges of said side walls to limit the outward movement of said stays and bent support, said support having means for connecting said support to said body when said support is folded against the bottom of said body.

15. A container composed of sheet material bent to form a body, a cover therefor and a support, said body having double side walls, said support being hinged to said body and having laterally bent stays slidable in said double walls, said stays being arc-shaped and slidable in said side walls through slits provided in the lower edges of said side walls and having projections cooperating with the lower edges of said side walls to limit the outward movement of said stays and bent support, said support having a tongue extending through a slit provided in the bottom of said body for holding said support in collapsed position against said bottom of said body.

16. A container composed of sheet material bent to form a body, a cover therefor and a support, said support being hinged to an end of said body and having stays connecting said support to said body when folded against said body, and means for limiting the opening and closing movements of said support.

17. A container composed of sheet material bent to form a body, a cover therefor and a connected double support, one side of said support being hinged to an end of said body and the other side thereof being hinged to the bottom of said body, said support having a tongue extending from a side of said support and cut from the other side of said support, and insertable through a slit provided in the bottom of said body for holding said support folded against the bottom of said body.

18. A container composed of sheet material bent to form a body, a cover therefor and a support, said support composed of a pair of sections hinged together at one side of said sections and hinged to the body at the other side of said sections whereby said support may be folded against the bottom of said body in the collapsed position of said support and extended downwardly in supporting position for holding the body in an inclined position.

19. A container composed of sheet material bent to form a body, a cover therefor and a support, said support composed of a pair of sections hinged together at one side of said sections and respectively hinged to an end wall and the bottom of said body at the other side of said sections, whereby said support may be folded against the bottom of said body in the collapsed position of said support and extended downwardly in supporting position for holding the body in an inclined position.

20. A container composed of sheet material bent to form a body, a cover therefor and a support, said support composed of a pair of sections hinged together at one side of said sections and respectively hinged to an end wall and the bottom of said body at the other side of said sections, whereby said support may be folded against the bottom of said body in the collapsed position of said support and extended downwardly in supporting position for holding the body in an inclined position, said sections having laterally bent stays slidably extending into said body and operable to stay said support in a supporting position.

21. A container composed of sheet material bent to form a body and a cover hinged to one end of said body, said cover being bent to form a display panel above said body and having anchor members at right angles to and having the edges thereof bearing against the rear end wall of said body.

22. A container composed of sheet material bent to form a body and a cover hinged at one end of the body, said cover being bent to form a display panel above the body and having projections bent from the sides of the panel and with the edges of the projections bearing against the rear end wall of the body.

In witness whereof, I hereunto subscribe my name to this specification.

CHARLES W. JACK.